Patented Aug. 25, 1925.

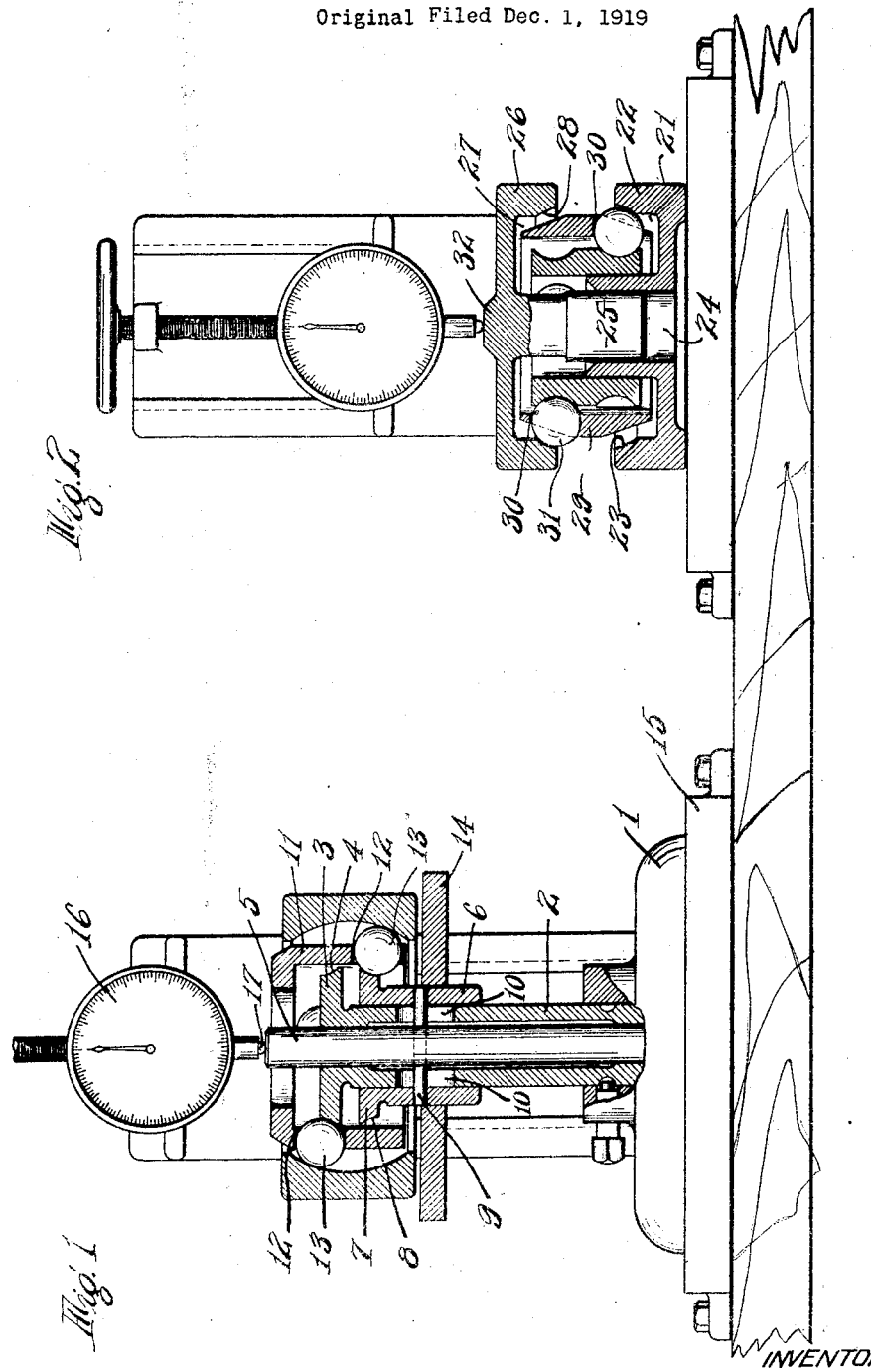

1,550,671

UNITED STATES PATENT OFFICE.

RENE J. BRAULT, OF PLAINVILLE, CONNECTICUT, ASSIGNOR, BY MESNE ASSIGN-
MENTS, TO STANDARD STEEL AND BEARINGS INCORPORATED, OF WILMINGTON,
DELAWARE, A CORPORATION OF DELAWARE.

GAUGE.

Application filed December 1, 1919, Serial No. 341,717. Renewed January 15, 1925.

*To all whom it may concern:*

Be it known that I, RENE J. BRAULT, a citizen of the United States, and a resident of Plainville, in the county of Hartford and State of Connecticut, have invented certain new and useful Improvements in Gauges, of which the following is a specification.

My invention relates to measuring instruments, and more especially to gauges for matching or pairing coacting members, such, for example, as the race members of an antifriction bearing.

In order that antifriction bearings may attain their highest efficiency it is essential that the dimensions of the two race members be such that, when concentrically arranged, the lines of contact of the balls with the raceways or ball paths are spaced apart a fixed and uniform distance, namely, the diameter of the balls to be used. It is, however, practically impossible, except under the most favorable conditions, to uniformly produce race members having accurate or standard diameter ball paths. In the case especially of a double-row bearing in which the axis of rotation of each ball is oblique to the axis of rotation of the bearing, the previous method of measurement of the ball grooves at a fixed point, such, for example, as the bottom of the groove or a fixed distance from the face of the race member, gives only an approximate indication as to the dimensions of the ball paths or circles of contact of the balls with the raceways and is useful only to detect errors of sufficient magnitude to prevent utilization of the race member. It has, therefore, been the custom heretofore to assemble indiscriminately into bearings with standard balls such inner and outer race members as were within certain limits, and then try out the bearings. In case a bearing was too tight or too loose, it was disassembled and the race members again assembled with balls a trifle smaller or larger than standard. This condition naturally increased the labor cost of the bearing since there was no certainty that the first assembling would produce a correct bearing, and it also necessitated a large stock of balls differing slightly from standard. As a premium is placed by ball manufacturers on balls other than standard, there was still another item added to the cost of production.

My invention contemplates a gauge by means of which the diameter of the actual ball paths or lines of contact of the balls with the ball grooves of the race members of a bearing, and more especially of that type of double-row bearing in which the load line is oblique to the axis of the bearing, may be compared with respect to the diameter of the ball path of a standard race member and by the use of which the race members may be sorted according to the difference in the diameter of their actual ball paths from that of a standard ball path whereby an inner and outer race member having ball paths differing from their respective standards by the same amount may be assembled with standard balls to produce a correct bearing.

The object of this invention is the provision of a gauging device whereby the diameters of the ball paths or ball contact lines of race members may be compared with the diameter of the ball paths or ball contact lines of a standard race member.

An additional object of the invention is the provision of a gauging device in which the comparing is accomplished by duplicating actual bearing conditions.

A further object of the invention is the provision of a gauging device by means of which component parts of a bearing may be measured, independently of each other, with respect to the line of contact of the balls therewith.

To accomplish the objects of this invention and to improve generally upon devices of this character, I provide a two-part member, the two parts of which are coaxial and capable of movement toward and away from each other along their common axis. The periphery of each of the two parts is a conical or conoidal surface which preferably is of the same dimensions and characteristics as that portion of the ball groove of a standard race member along which the ball travels, so that each of the two parts is in effect a portion of a standard race member. Operatively associated with the two-part race member is a cage or holder in which are loosely mounted two series of balls which are adapted to engage with the peripheral surfaces of the two-part race member, and also the ball grooves of the member to be gauged along the same path as the balls in the assembled bearing will contact, thereby duplicating actual operating conditions. Arranged to be engaged by a suitable portion of one of the two relatively-movable parts of the split race member is an indicator, by means of which the variation from standard of the member being gauged may be determined. With this instrument the race members are compared with respect to the actual ball path or line of contact of the balls with the race member instead of with respect to some line at a fixed distance from some part of the bearing.

As the various race members are gauged they are sorted according to their difference from their respective standards. Inner and outer race members differing from their respective standards by the same amounts are then assembled with standard balls. Since the difference between the diameters of the circles of contact of the balls with their respective raceways is standard, correct bearings are uniformly produced.

Thus it is seen that I have devised a comparing or matching instrument by the use of which correct bearings are always produced at the first assembly, and all the bearings produced are uniform. Not only does the use of this instrument insure uniformly correct bearings, but it also materially decreases the cost of production, since there is no wasted labor in the assembling of the bearings and no need of a supply of odd-size balls.

Other objects, features and advantages of the invention will be apparent from the accompanying specification and appended claims.

Although I have described my invention more particularly with reference to its use in the matching or pairing of race members of an antifriction bearing, it is apparent that it is of utility in any instance where it is desired to accurately pair coacting units In the drawings are disclosed certain preferred embodiments of the invention wherein Fig. 1 is a vertical section through a gauge for comparing outer race members, and Fig. 2 is a like section of a gauge for comparing inner race members.

The gauge illustrated in Fig. 1 comprises a base 1 upon which is carried the upright cylindrical member 2, the upper end of which is shaped to form a circular head 3. Around the periphery of the head 3 is provided a conical or conoidal surface 4 which is preferably of the same diameter and curvature as the portion of the raceway of a standard inner race member along which the balls travel or contact with the race member. Extending through a bore in the member 2, and snugly though slidably mounted therein, is the contact member 5.

A sleeve 6 fits snugly though slidably around the exterior of the member 2 and carries a head 7, similar to the head 3 except that it is oppositely disposed, and provided with a peripheral surface 8 of the same characteristics as the surface 4. The contact member 5 is joined to the sleeve 6 by means of the pin 9 which extends through suitable slots 10 in the member 2. A ball holder or cage 11 is operatively associated with the two heads 3 and 7. In the cage are two series of apertures 12 uniformly spaced apart. In the apertures are provided the balls 13, preferably of the same standard size as the balls to be actually used in the bearing. The cage is so designed that the balls may move transversely of the apertures and may also project beyond the interior and exterior surfaces of the cage at the same time. A plate 14, firmly attached in any desired manner, is carried by the member 6. By means of this plate 14 the member 6 may be lifted, and it is so placed on the member 6 that when the head 7 has been sufficiently raised to allow the lower row of balls 13 to move inwardly, it will contact with the cage to lift it to allow the upper row to move inwardly, whereby an outer race member being gauged may be placed or removed. It also acts as a support for the race member when first applied to the gauge and just before its removal therefrom.

To utilize this device it is placed upon a bed 15, having a smooth horizontal upper surface with which is associated the indicator 16 in such a way that the plunger 17 thereof is adapted to engage the upper protruding end of the contact member 5. A standard outer race member is then placed in position and a reading of the indicator taken. For convenience, an indicator having a dial reading both ways from a zero may be used and the pointer of the indicator set at zero when the standard race member is in position. After the indicator has been set and the standard race member removed, the race members to be gauged are placed by moving the sleeve 6, through the medium of the plate 14, to bring the heads 3 and 7 into close contact, thereby allowing sufficient clearance for the balls 13 to roll inwardly enough so that the race member may be positioned around the cage with its faces substantially in alinement with those of the cage. The sleeve 6 is then allowed to drop, bringing the surfaces 4 and 8 into contact with the balls and forcing them into contact with the ball paths on the inner portion of the outer race member. The race member is then preferably rotated somewhat in order to make sure that good contact has been obtained. A reading of the indicator will show how the ball paths of the race member, or the lines of contact of the balls therewith being gauged compares with the ball paths of the standard race member. This race member will then be paired with an inner race member showing a corresponding variation from standard. The device may be moved into and out of engaging position with the indicator to allow the applying and removal of the race member.

In Fig. 2 is disclosed a device based upon the same principle but adapted for comparing the ball paths of inner race members with the ball paths of a standard inner race member. The base 21 is formed with an annular slot 22 provided at the upper edge of the outer wall with an inwardly-facing conical or conoidal surface 23 which is preferably of the same diameter and curvature as that portion of the raceway of a standard outer race member along which the balls travel or contact with the race member. The inner wall of the slot 22 extends above the outer wall and the diameter of its periphery is such as to allow the bore of an inner race member to fit loosely thereover. Coaxial with the surface 23 is a circular bore 24. Adapted to fit snugly but slidably in the bore 24 is a stem 25 which carries at one end the circular head 26 in which is an annular slot 27, provided at the lower edge of its outer wall with an inwardly-facing surface 28 corresponding to but oppositely disposed to the surface 23. A cage 29 is provided with suitable apertures 30 to support the balls 31, preferably of the same standard size as the balls to be used in the bearing, and is of proper dimensions to fit over a race member to be gauged without obstructing the free movement of the head 26 relative to the base 21. On the upper surface of the head 26 is a contact abutment 32 to engage the plunger of an indicator. After the pointer of the indicator has been set with reference to a standard inner race member, and the standard removed, an inner race member may be compared by placing it over the inner wall of the slot 22, and the cage 29 over the race member, and resting it on the bottom of the slot 22, this being possible since the balls are free to move outwardly and transversely in their apertures. The stem 25 is then inserted in the bore 24 and the surfaces 23 and 28 engaged with the balls 31, which also engage the raceways of the member to be compared whereby both the cage and race member are lifted out of contact with the bottom of the slot 22. The head 26 is then rotated to insure a good contact, after which the device is slipped under the indicator, the abutment 32 engaging the plunger thereof, and a reading taken to compare the race member with a standard.

In each of the devices disclosed, the force tending to move the elements of the two-part member from or toward each other is merely that of gravity. It is apparent, however, that, if desired, other or additional means may be provided to accomplish the result.

It will be noted that, in each of these devices, the comparing of the ball paths is accomplished by reproducing actual bearing conditions, the measurements being taken relative to the actual ball paths and not relative to a theoretical line arbitrarily fixed.

Although in the drawings I have disclosed the surfaces 4 and 8, and 23 and 28, in the form of portions of a ball groove or raceway, it is readily apparent that these surfaces may have straight tapers, in which event they would be of suitable dimensions to force the balls into contact with the member to be gauged. In either event the sections 3 and 7, or 21 and 26, are in effect portions of a standard race member.

It is, of course, understood that the particular device shown and described in the present application illustrates merely a preferred form of construction and arrangement of parts, which, it has been found, will successfully carry out the principles of my invention, and various changes and modifications of details may be easily made without departing from the spirit of my invention as defined in the appended claims.

What I claim is:

1. In a device for measuring parts of a character to be assembled with coacting parts, a member comprising sections, each of which is in effect a portion of a standard part of a character to coact with the part being measured, said sections being movable relative to each other, and contact elements adapted to engage said sections and the part to be measured.

2. In a device for measuring race members for antifriction bearings, a member comprising sections, each of which is in effect a portion of a standard race member of a character to coact with the race member to be measured, said sections being movable relative to each other, and contact elements adapted to engage the sections and the race member to be measured.

3. In a device for measuring race members for antifriction bearings, a member comprising sections, each of which is in effect a portion of a standard race member of a character to coact with the race member to be measured, said sections being coaxial and capable of axial displacement relative to each other, and contact elements adapted to engage said sections and the race member to be measured.

4. In a device for measuring units of a character to be assembled with coacting units, a member comprising sections, each of which is in effect a portion of a standard unit of a character to coact with the unit being measured, said sections being movable relative to each other, contact elements adapted to engage said sections and the unit to be measured, and means to interpose said contact elements between said sections and said unit.

5. In a device for measuring race members for antifriction bearings, a member comprising sections, each of which is in effect a portion of a standard race member of a character to coact with the race member to be measured, said sections being movable relative to each other, contact elements adapted to engage the sections and the race member to be measured, and means to interpose said contact elements between said sections and said race member.

6. In a device for measuring race members for antifriction bearings, a member comprising sections, each of which is in effect a portion of a standard race member of a character to coact with the race member to be measured, said sections being coaxial and capable of axial displacement relative to each other, contact elements adapted to engage said sections and the race member to be measured, and means to interpose said contact elements between said sections and said race member.

7. In a device for measuring units of a character to be assembled with coacting units, a member comprising sections, each of which is in effect a portion of a standard unit of a character to coact with the unit being measured, said sections being movable relative to each other, contact elements adapted to engage said sections and the unit to be measured, and means carried by one of said sections to cooperate with an indicator.

8. In a device for measuring race members for antifriction bearings, a member comprising sections, each of which is in effect a portion of a standard race member of a character to coact with the race member to be measured, said sections being coaxial and capable of axial displacement relative to each other, and contact elements adapted to engage said sections and the race member to be measured.

9. In a device for measuring race members for antifriction bearings, a member comprising sections, a curved surface on each of said sections corresponding to a raceway of a standard race member of a character to coact with the race member to be measured, said sections being movable relative to each other, and contact elements adapted to engage the said curved surfaces and the raceways of the member to be measured.

10. In a device for measuring race members for antifriction bearings, a member comprising sections, a curved surface on each of said sections corresponding to a raceway of a standard race member of a character to coact with the race member to be measured, said sections being coaxial and capable of axial displacement relative to each other, and contact elements adapted to engage the said curved surfaces and the raceways of the member to be measured.

11. In a device for measuring race members for antifriction bearings, a member comprising sections, a curved surface on each of said sections corresponding to a raceway of a standard race member of a character to coact with the race member to be measured, said sections being movable relative to each other, contact elements adapted to engage the said curved surfaces and the raceways of the member to be measured, and means to interpose said contact elements between said surfaces and the raceways of the member to be measured.

12. In a device for measuring race members for antifriction bearings, a member comprising sections, a curved surface on each of said sections corresponding to a raceway of a standard race member of a character to coact with the race member to be measured, said sections being coaxial and capable of axial displacement relative to each other, contact elements adapted to engage the said curved surfaces and the raceways of the member to be measured, and means to interpose said contact elements between said surfaces and the raceways of the member to be measured.

13. In a device for measuring race members for antifriction bearings, a member comprising sections, a curved surface on each of said sections corresponding to a raceway of a standard race member of a character to coact with the race member to be measured, said sections being coaxial and capable of axial displacement relative to each other, contact elements adapted to engage the said curved surfaces and the raceways of the members to be measured, means to interpose said contact elements between said surfaces and the raceways of the member to be measured, and means carried by one of said sections to cooperate with an indicator.

14. In a device for measuring units of a character to be assembled with coacting units, members, each of which is in effect a section of a standard unit of a character to coact with the unit being measured, one of said members having an aperture therein and the other a shank mounted in said aperture, said members being relatively movable, and contact means adapted to be engaged with said members and the unit to be gauged.

15. In a device for measuring race members for antifriction bearings, members, each of which is in effect a section of a standard race member of a character to coact with the race member to be measured, one of said members having an aperture therein and the other a shank mounted in said aperture, said members being relatively movable, and contact means adapted to be engaged with said members and the unit to be gauged.

16. In a device for measuring units of a character to be assembled with coacting units, members, each of which is in effect a section of a standard unit of a character to coact with the unit being measured, one of said members having an aperture therein and the other a shank mounted in said aperture, said members being relatively movable, contact means adapted to be engaged with said members and the unit to be gauged, and means for interposing said contact elements between said members and said unit.

17. In a device for measuring race members for antifriction bearings, members, each of which is in effect a section of a standard race member of a character to coact with the race member to be measured, one of said members having an aperture therein and the other a shank mounted in said aperture, said members being relatively movable, contact means adapted to be engaged with said members and the unit to be gauged, and means for interposing said contact elements between said members and said race member.

18. In a device for measuring race members for antifriction bearings, members, each of which has a curved surface corresponding to a raceway of a standard race member of a character to coact with the race member to be measured, and contact elements adapted to engage the said curved surfaces and the raceways of the member to be measured.

19. In a device for measuring race members for antifriction bearings, members, each of which has a curved surface corresponding to a raceway of a standard race member of a character to coact with the race member to be measured, contact elements adapted to engage the said curved surfaces and the raceways of the member to be measured, and means for interposing said contact elements between said curved surfaces and the raceways of the member to be measured.

20. In a device for measuring race members for antifriction bearings, members, each of which has a curved surface corresponding to a raceway of a standard race member of a character to coact with the race member to be measured, contact elements adapted to engage the said curved surfaces and the raceways of the member to be measured, means for interposing said contact elements between said curved surfaces and the raceways of the member to be measured, and means carried by one of said members to cooperate with an indicator.

21. In a device for measuring outer race members for antifriction bearings, members, each of which is in effect a section of a standard inner race member, said members being coaxial and capable of axial displacement relative to each other, contact elements adapted to engage said members and the race member to be gauged, and a rod coaxial with said members and carried by one of them, adapted to cooperate with an indicator.

22. In a device for measuring outer race members for antifriction bearings, members, each of which is in effect a section of a standard inner race member, one of said members having an aperture, a shank on the other member mounted in said aperture, said members being relatively movable, a rod carried by said last-named member and adapted to cooperate with an indicator, and contact elements adapted to engage said members and said outer race member.

23. In a device for measuring outer race members for antifriction bearings, members, each of which is in effect a section of a standard inner race member, one of said members having a fixed tubular shank provided with apertures, and the other member being slidably mounted on said shank, a rod slidably mounted in said shank adapted to cooperate with an indicator, a pin extending through said apertures and connecting said rod and said second member, and contact elements adapted to engage said members and said outer race member.

RENE J. BRAULT.